(No Model.)
S. GASSER.
POTATO PLANTER.
No. 537,525. Patented Apr. 16, 1895.
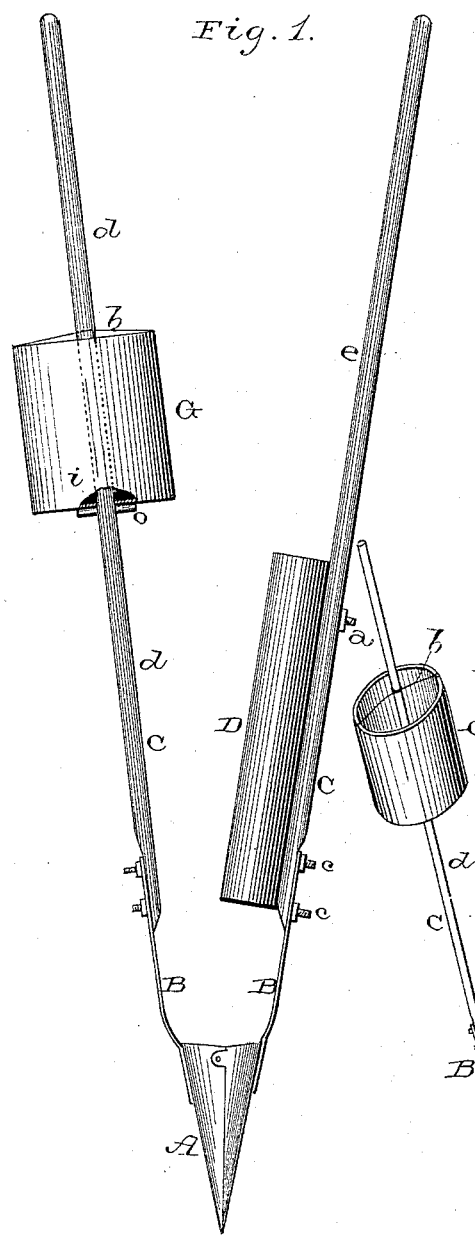
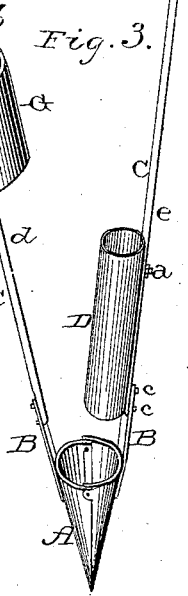
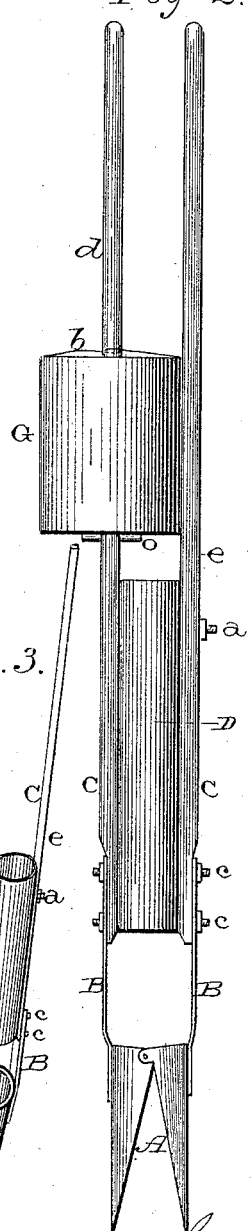
Witnesses
F. A. Lehmann
John N. Siggers
By his Attorneys
C. A. Snow & Co.
Inventor
Sanford Gasser

UNITED STATES PATENT OFFICE.

SANFORD GASSER, OF SHERMAN, MICHIGAN.

POTATO-PLANTER.

SPECIFICATION forming part of Letters Patent No. 537,525, dated April 16, 1895.

Application filed July 24, 1894. Serial No. 518,496. (No model.)

*To all whom it may concern:*

Be it known that I, SANFORD GASSER, a citizen of the United States, residing at Sherman, in the county of Wexford and State of Michigan, have invented a new and useful Potato-Planter, of which the following is a specification.

My invention relates to an improvement in potato planters, and it consists in the curved and pointed blades, pivoted together at their upper corners, the handles secured to the blades, and a guiding tube secured to one handle for directing the potatoes between the blades, and a basket or receptacle placed upon the other handle, as will be more fully described hereinafter.

The object of my invention is to provide a machine that is especially adapted to planting potatoes by hand, and by means of which the potatoes can be rapidly planted at a uniform depth and in the exact places desired.

In the accompanying drawings: Figures 1 and 2 are side elevations of a machine which embodies my invention, the parts being shown in different positions. Fig. 3 is a perspective of the same, on a reduced scale.

A represents the curved planting blades, substantially semi-conical and sharpened at their lower ends so as to readily penetrate the ground and pivoted together at their upper corners in the usual manner. To each blade is secured a shank B which is bolted at its upper end to the lower end of a handle C, and to one handle e is rigidly bolted the guiding tube D, by which the potatoes are guided in falling, between the two planting blades. This tube is secured in place by a single bolt a, at its upper end, and at its lower end by the two bolts c which secure the shank to the handle. Upon the opposite handle d, is placed a basket, pail, or receptacle G of any suitable kind for holding the potatoes, and which receptacle has a hole i, made through its bottom so that the upper end of the handle can pass up through it, as shown in Fig. 1. Extending horizontally through this handle d, at any desired point, is a pin or nail o, upon which the receptacle is supported at its lower end. To prevent the upper end of the receptacle from swaying back and forth on the handle, a wire or cord b is used, the ends of the wire or cord being secured to opposite sides of the receptacle, while its center is wrapped one or more times around the handle.

To operate my planter, the ground is first marked off so as to show exactly where the potatoes are to be planted. The handles are then first moved outwardly, as shown in Figs. 1 and 3, so as to bring the lower points of the blades together, and then the foot is placed upon their upper ends and they are forced into the ground to any desired depth. The operator takes a potato from the receptacle G, drops it into the upper end of the guiding tube D, and then forces the upper ends of the handles toward each other, as shown in Fig. 2. This movement of the handles causes the blades to separate at their lower ends and the potato passes down in the opening made for it. In raising the planter to move on to the next planting place, the displaced earth falls into the opening and covers the potato so that nothing more is required to be done to it.

By means of a planter constructed and operated as here shown, potatoes can be planted almost as rapidly as corn, beans, or other similar crops. To enable the operator to use the planter easily, the blade secured to the handle e, may be made slightly smaller than the opposite one, and hence less force has to be exerted in moving this blade which is moved more than the other one because the receptacle carrying the potatoes is attached to that handle.

Having thus described my invention, I claim—

1. A planter, comprising two substantially semi-conical blades pivotally connected, the two handles secured to the blades, a guide tube mounted on one of the handles and located above the blades, and a receptacle located above the guide tube and carried by one of the handles, substantially as described.

2. In a potato planter, the two handles, the pivoted blades secured thereto, a receptacle having an opening through its bottom up through which the end of one handle passes, a support on the handle for the receptacle, and a wire or cord fastened to the upper end of the receptacle and the handle, the parts being combined and arranged to operate substantially as set forth.

In testimony that I claim the foregoing as my own I have hereto affixed my signature in the presence of two witnesses.

SANFORD GASSER.

Witnesses:
H. F. CAMPBELL,
E. A. MCMANUS.